(12) United States Patent
Byun et al.

(10) Patent No.: US 10,721,654 B2
(45) Date of Patent: Jul. 21, 2020

(54) METHOD AND APPARATUS FOR ENHANCING HANDOVER PROCEDURE FOR SUPPORTING CONDITIONAL HANDOVER IN WIRELESS COMMUNICATION SYSTEM

(71) Applicant: LG Electronics Inc., Seoul (KR)

(72) Inventors: Daewook Byun, Seoul (KR); Hongsuk Kim, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/552,672

(22) Filed: Aug. 27, 2019

(65) Prior Publication Data
US 2020/0068448 A1    Feb. 27, 2020

Related U.S. Application Data

(60) Provisional application No. 62/723,443, filed on Aug. 27, 2018.

(51) Int. Cl.
*H04W 36/00*      (2009.01)
*H04W 36/14*      (2009.01)

(52) U.S. Cl.
CPC ....... *H04W 36/0009* (2018.08); *H04W 36/14* (2013.01)

(58) Field of Classification Search
CPC .......................... H04W 36/30; H04W 36/0072
See application file for complete search history.

(56) References Cited

U.S. PATENT DOCUMENTS 10,425,876 B2 *    9/2019    Dai ................... H04W 36/0069

FOREIGN PATENT DOCUMENTS

WO     WO2013/024574      2/2013

OTHER PUBLICATIONS

3rd Generation Partnership Project; Technical Specification Group Radio Access Network; NR, "NR and NG-RAN Overall Description; Sage 2 (Release 15)," 3GPP TS 38.300, V15.2.0, dated Jun. 2018, 10 pages.
ASTRI, TCL Communication Ltd., "Discussion on Conditional Handover in NR", R2-1802008, 3GPP TSG-RAN WG2 Meeting #101, Athens, Greece, Feb. 26-Mar. 2, 2018, 6 pages.
Ericsson, "Connected mode mobility in NR-U", R2-1812371, 3GPP TSG-RAN WG2 #103, Göteborg, Sweden, Aug. 20-24, 2018, 4 pages.
Lenovo, Motorola Mobility, "Analysis on conditional handover in NR system", R2-1801026, 3GPP TSG-RAN WG2 Meeting NR AH1801, Vancouver, Canada, Jan. 22-26, 2018, 3 pages.

(Continued)

*Primary Examiner* — Chandrahas B Patel
(74) *Attorney, Agent, or Firm* — Fish & Richardson P.C.

(57) ABSTRACT

A method and apparatus for enhancing a handover procedure for supporting conditional handover in a wireless communication system. A source base station (e.g. source gNB/eNB) receives a message informing that a wireless device is handed over from the source base station to a target base station (e.g. target gNB/eNB). The target base station is one of candidate target base stations in the conditional handover procedure. After receiving the message, the source base station transmits a sequence number (SN) status transfer message to the target base station.

20 Claims, 14 Drawing Sheets

(56) References Cited

OTHER PUBLICATIONS

OPPO, "Discussion on Conditional Handover Optimization", R2-1801784, 3GPP TSG-RAN WG2#101, Athens, Greece, Feb. 26-Mar. 2, 2018, 3 pages.
PCT International Search Report in International Application No. PCT/KR2019/010697, dated Nov. 29, 2019, 3 pages.

* cited by examiner

METHOD AND APPARATUS FOR ENHANCING HANDOVER PROCEDURE FOR SUPPORTING CONDITIONAL HANDOVER IN WIRELESS COMMUNICATION SYSTEM

CROSS-REFERENCE TO RELATED APPLICATIONS

Pursuant to 35 U.S.C. § 119(e), this application claims the benefit of U.S. Provisional Application No. 62/723,443 filed on Aug. 27, 2018, the contents of which are all hereby incorporated by reference herein in their entirety.

TECHNICAL FIELD

The present disclosure generally relates to wireless communication and, more particularly, to a handover procedure for supporting conditional handover in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In one aspect of the present disclosure, a method is performed by a source base station in a conditional handover procedure. The method includes: receiving a message informing that a wireless device is handed over from the source base station to a target base station, wherein the target base station is one of candidate target base stations in the conditional handover procedure. The method also includes, after receiving the message, transmitting a sequence number (SN) status transfer message to the target base station. Other embodiments of this aspect include corresponding computer systems, apparatus, and computer programs recorded on one or more computer storage devices, each configured to perform the actions of the methods.

Implementations may include one or more of the following features. In some implementations, data is forwarded to the target base station after transmitting the SN status transfer message to the target base station. In some implementations, the message is a handover success message. In some implementations, the message requests triggering a transmission of the SN status transfer message. In some implementations, the message requests triggering of a handover cancel procedure. In some implementations, the handover cancel procedure is performed towards the candidate target base stations except the target base station. In some implementations, the wireless device is already detached from the source base station. In some implementations, the target base station is a base station which receives a reconfiguration complete message from the wireless device. In some implementations, a user equipment (UE) handover complete message is received by the source base station from the wireless device, before the wireless device is not detached from the source base station. In some implementations, the UE handover complete message includes an identifier (ID) of a cell served by the target base station. In some implementations, a handover request message is transmitted by the source base station to each of the candidate target base stations, wherein a handover request acknowledge message is received by the source base station from each of the candidate target base stations, and wherein the handover request acknowledge message includes a handover command for each of the candidate target base stations. In some implementations, the wireless device is in communication with at least one of a user equipment, a network, or autonomous vehicles other than the wireless device. Implementations of the described techniques may include hardware, a method or process, or computer software on a computer-accessible medium.

In another aspect of the present disclosure, a source base station is configured to operate a conditional handover procedure. The source base station includes: a transceiver; at least one processor; and at least one computer memory operably connectable to the at least one processor and storing instructions that, when executed, cause the at least one processor to perform operations that include: receiving, through the transceiver, a message informing that a wireless device is handed over from the source base station to a target base station, wherein the target base station is one of candidate target base stations in the conditional handover procedure. The operations also include, after receiving the message, transmitting, through the transceiver, a sequence number (SN) status transfer message to the target base station.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

DETAILED DESCRIPTION

Figure 1:
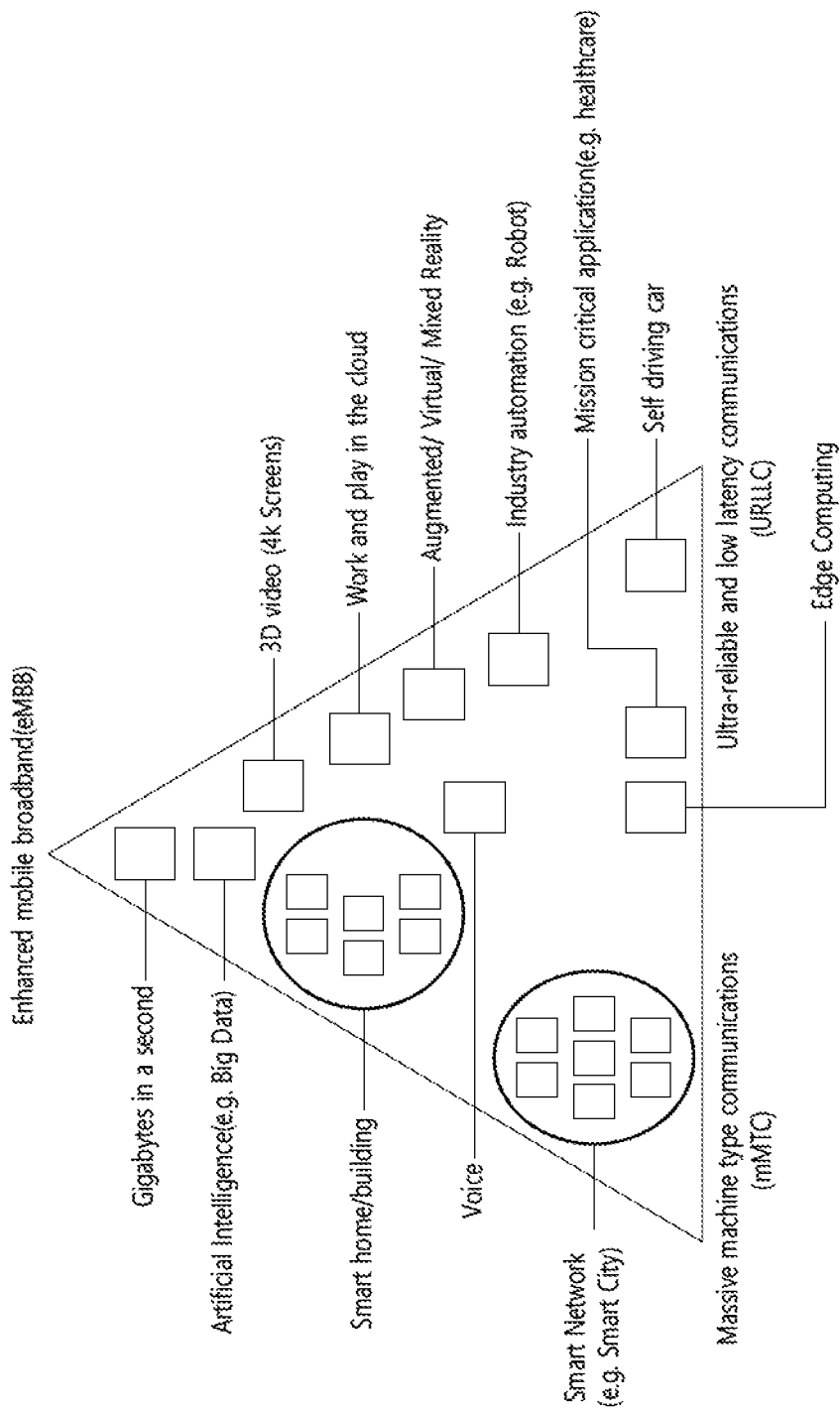
FIG. 1 shows examples of 5G usage scenarios to which the technical features of the present disclosure can be applied.

Implementations of the present disclosure enable systems and techniques for enhancing a handover procedure for supporting conditional handover in a wireless communication system.

In $5^{th}$ generation (5G) communication system, it is being discussed to introduce conditional mobility. One example of conditional mobility is conditional handover. The conditional handover splits the handover into two parts: communication with source cell is done early and late with the target cell. The conditional handover is essentially a network-configured but user equipment (UE)-controlled downlink mobility mechanism with a potential to reduce the interruption time and handover failure/radio link failure. The conditional handover improves the handover robustness significantly.

In some scenarios of a conditional handover, the source cell may not know to which target cell among multiple candidate target cells a wireless device is connected after detaching from the source cell. Therefore, unnecessary signaling and data forwarding to target gNBs to which the wireless device is not connected in case of conditional handover over Xn interface may occur. This problem should be avoided.

Some implementations include receiving a message informing that a wireless device is handed over from the source base station to a target base station, and after receiving the message, transmitting a sequence number (SN) status transfer message to the target base station. The target base station is one of candidate target base stations in the conditional handover procedure. Data can be forwarded only to a target base station to which a wireless device is actually handed over in conditional handover. Therefore, unnecessary signaling and data forwarding to target base stations to which the wireless device is not connected can be avoided.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
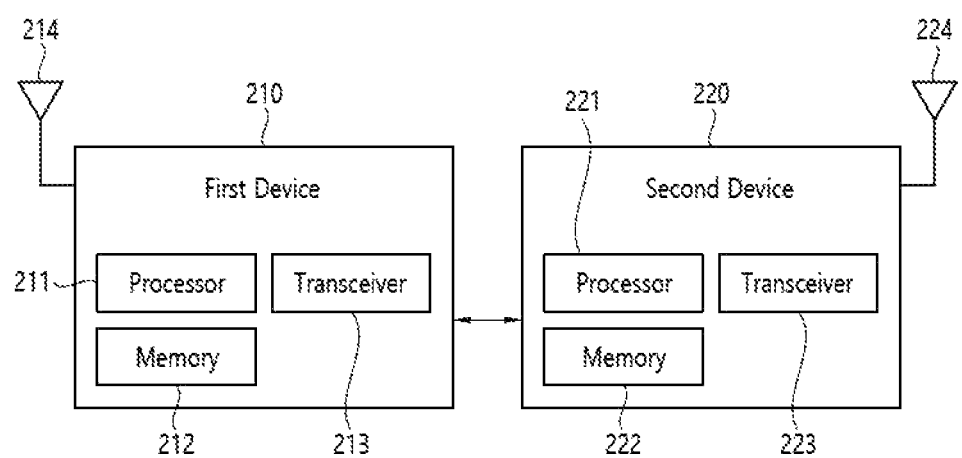
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
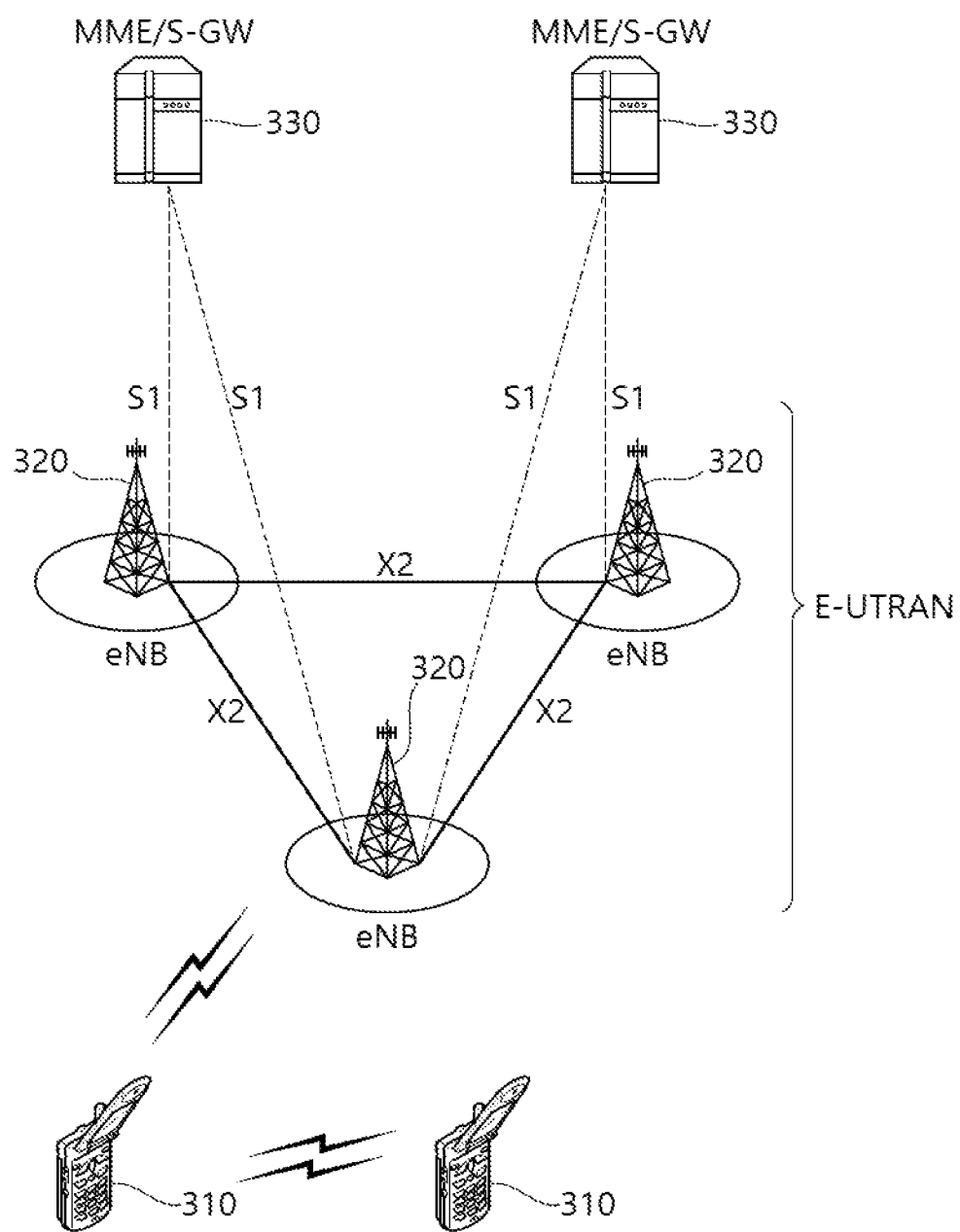
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMES/S-GWs and eNBs.

Figure 4:
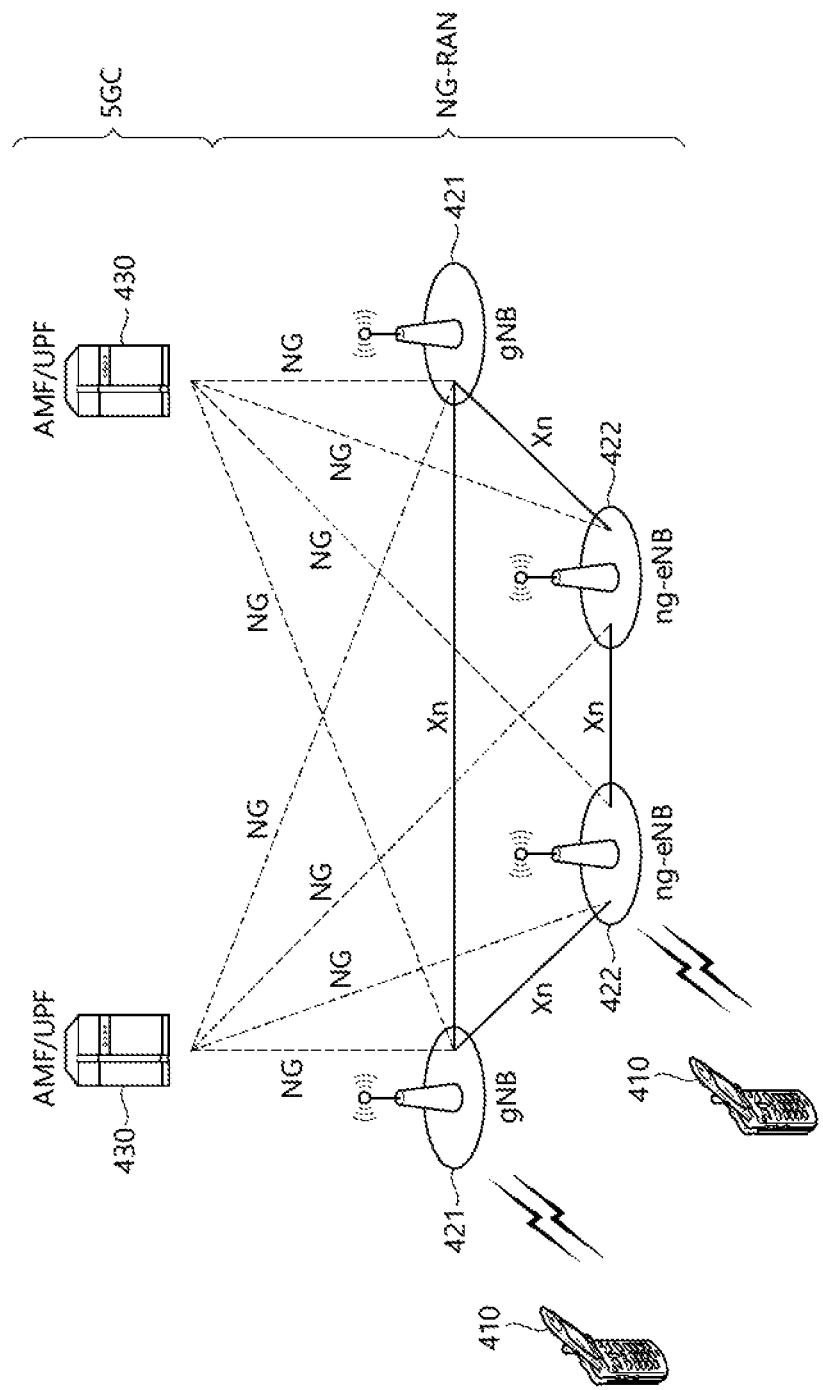
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity which, in some implementations, includes the functions of the MME. The UPF hosts the functions, such as mobility anchoring, protocol data unit (PDU) handling. The UPF an entity which, in some implementations, includes the functions of the S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model.

Figure 5:
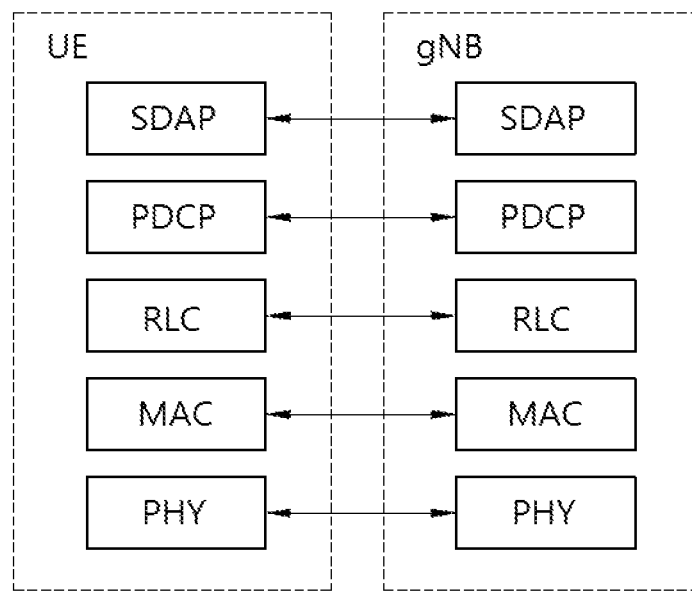
FIG. 5 shows a block diagram of a user plane protocol stack to which the technical features of the present disclosure can be applied.
Figure 6:
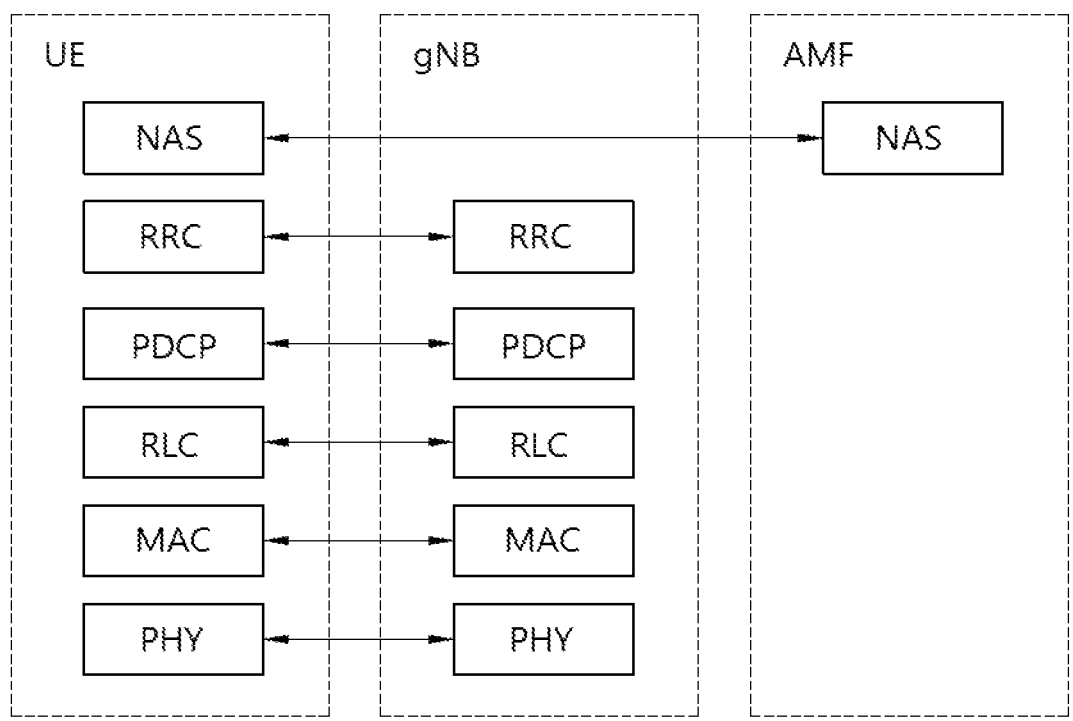
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Handover (HO) in 5G NR is described. Section 9.2.3.2 of 3GPP TS 38.300 V15.2.0 (2018-06) can be referred.

For C-plane handling, the intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB.

Figure 7:
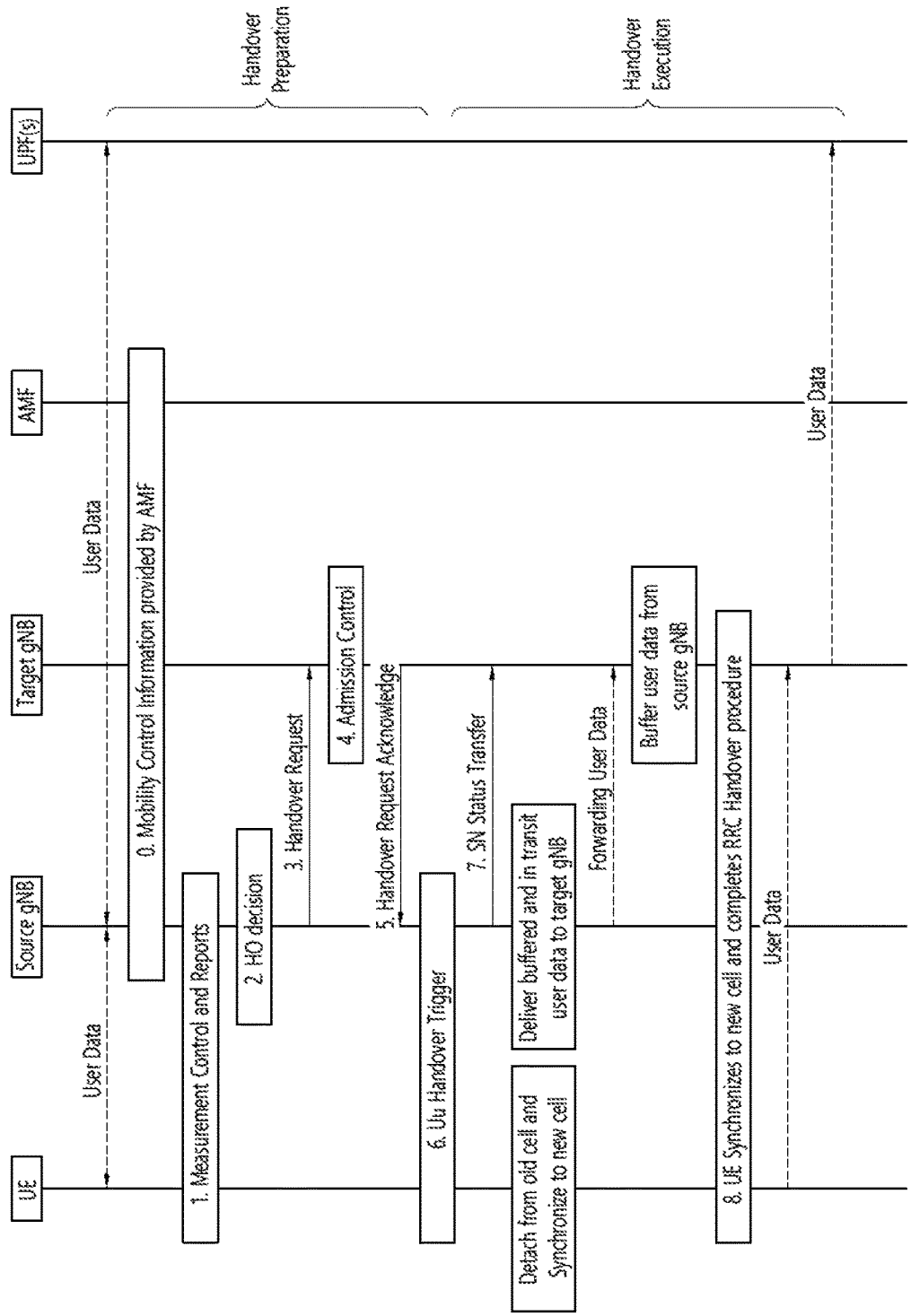
FIG. 7 shows basic intra-AMF/UPF handover scenario, i.e. where neither the AMF nor the UPF changes, to which the technical features of the present disclosure can be applied.

FIG. 7 shows basic intra-AMF/UPF handover scenario, i.e. where neither the AMF nor the UPF changes, to which the technical features of the present disclosure can be applied.

Only the preparation and execution phases of the handover procedure are described in FIG. 7. The complete phase of the handover procedure is not described in FIG. 7. The steps described in FIG. 7 can be applied to handover procedure in 5G LTE as well, without loss of generality.

Step 0: The UE context within the source gNB contains information regarding roaming and access restrictions which were provided either at connection establishment or at the last timing advance (TA) update.

Step 1: The source gNB configures the UE measurement procedures and the UE reports according to the measurement configuration.

Step 2: The source gNB decides to handover the UE, based on MeasurementReport and radio resource management (RRM) information.

Step 3: The source gNB issues a Handover Request message to the target gNB passing a transparent RRC container with necessary information to prepare the handover at the target side. The information includes at least the target cell ID, KgNB*, the cell radio network temporary identifier (C-RNTI) of the UE in the source gNB, RRM-configuration including UE inactive time, basic AS-configuration including antenna Info and DL Carrier Frequency, the current quality of service (QoS) flow to DRB mapping applied to the UE, the minimum system information from source gNB, the UE capabilities for different radio access technologies (RATs), PDU session related information, and can include the UE reported measurement information including beam-related information if available. The PDU session related information includes the slice information (if supported) and QoS flow level QoS profile(s).

Step 4: Admission control may be performed by the target gNB. Slice-aware admission control shall be performed if the slice information is sent to the target gNB. If the PDU sessions are associated with non-supported slices, the target gNB shall reject such PDU Sessions.

Step 5: The target gNB prepares the handover with L1/L2 and sends the Handover Request Acknowledge to the source gNB. The Handover Request Acknowledge message includes a transparent container to be sent to the UE as an RRC message to perform the handover.

Step 6: The source gNB triggers the Uu handover and sends the RRCReconfiguration message containing Handover Command message to the UE. The Handover Command message carries the information required to access the target cell, which includes at least the target cell ID, the new C-RNTI, the target gNB security algorithm identifiers for the selected security algorithms, can include a set of dedicated random access channel (RACH) resources, the association between RACH resources and synchronization signal (SS) blocks, the association between RACH resources and UE-specific channel state information reference signal (CSI-RS) configuration(s), common RACH resources, and target cell system information blocks (SIBs), etc.

Step 7: The source gNB sends the SN STATUS TRANSFER message to the target gNB.

Step 8: The UE synchronizes to the target cell and completes the RRC handover procedure by sending RRCReconfigurationComplete message to target gNB.

The RRM configuration can include both beam measurement information (for layer 3 mobility) associated to SS Block(s) and CSI-RS(s) for the reported cell(s) if both types of measurements are available. Also, if carrier aggregation (CA) is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SS block(s). The network can have dedicated RACH configurations associated to the SS block(s) and/or have dedicated RACH configurations associated to CSI-RS(s) within a cell. The target gNB can only include one of the following RACH configurations in the Handover Command to enable the UE to access the target cell:

i) Common RACH configuration;
ii) Common RACH configuration+Dedicated RACH configuration associated with SS-Block;
iii) Common RACH configuration+Dedicated RACH configuration associated with CSI-RS.

The UE continues to use the common RACH configuration of the source cell unless it is signaled in the Handover Command Message.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

The U-plane handling during the Intra-NR-access mobility activity for UEs in RRC_CONNECTED takes the following principles into account to avoid data loss during HO.

During HO preparation, U-plane tunnels can be established between the source gNB and the target gNB;

During HO execution, user data can be forwarded from the source gNB to the target gNB. Forwarding should take place in order as long as packets are received at the source gNB from the UPF or the source gNB buffer has not been emptied.

During HO completion, the target gNB sends a path switch request message to the AMF to inform that the UE has gained access and the AMF then triggers path switch related 5GC internal signalling and actual path switch of the source gNB to the target gNB in UPF. The source gNB should continue forwarding data as long as packets are received at the source gNB from the UPF or the source gNB buffer has not been emptied.

For RLC-AM bearers:

For in-sequence delivery and duplication avoidance, PDCP sequence number (SN) is maintained on a per DRB basis and the source gNB informs the target gNB about the next DL PDCP SN to allocate to a packet which does not have a PDCP sequence number yet (either from source gNB or from the UPF).

For security synchronization, hyper frame number (HFN) is also maintained and the source gNB provides to the target one reference HFN for the UL and one for the DL i.e. HFN and corresponding SN.

In both the UE and the target gNB, a window-based mechanism is used for duplication detection and reordering.

The occurrence of duplicates over the air interface in the target gNB is minimized by means of PDCP SN based reporting at the target gNB by the UE. In uplink, the reporting is optionally configured on a per DRB basis by the gNB and the UE should first start by transmitting those reports when granted resources are in the target gNB. In downlink, the gNB is free to decide when and for which bearers a report is sent and the UE does not wait for the report to resume uplink transmission.

The target gNB re-transmits and prioritizes all downlink data forwarded by the source gNB (i.e. the target gNB should first send all forwarded PDCP SDUs with PDCP SNs, then all forwarded downlink SDAP SDUs before sending new data from 5GC), excluding PDCP SDUs for which the reception was acknowledged through PDCP SN based reporting by the UE. The target gNB sends PDCP SDUs applying a QoS flow to DRB mapping the same as the mapping in the source gNB.

The UE re-transmits in the target gNB all uplink PDCP SDUs starting from the oldest PDCP SDU that has not been acknowledged at RLC in the source, excluding PDCP SDUs for which the reception was acknowledged through PDCP SN based reporting by the target. The UE applies the same QoS flow to DRB mapping as it does in the source gNB.

For RLC-UM bearers:

The PDCP SN and HFN are reset in the target gNB;
No PDCP SDUs are retransmitted in the target gNB;
The target gNB prioritises all downlink SDAP SDUs forwarded by the source gNB over the data from the core network;

The UE does not retransmit any PDCP SDU in the target cell for which transmission had been completed in the source cell.

Conditional handover is described. Conditional handover is one aspect of conditional mobility. Conditional mobility including conditional handover can be applied to both handover in 5G LTE and handover in 5G NR.

The mobility enhancement is being discussed in 5G. To improve handover/secondary cell group change (SCG) reliability and robustness, especially considering challenges in high/med frequency, the conditional handover over Xn interface is being considered.

In the conditional handover, if the UE reports measurement results on one or more cells, the network would prepare the multiple cells which is in proximity of the reported cell(s) as candidates target cells of the conditional handover. The network would provide the UE with handover assistance information which includes set of candidate target cells and handover conditions. Then, the UE would initiate to evaluate the handover conditions for the candidate target cells to determine whether to perform handover procedure to one of the candidate target cells. If the handover conditions are met for one of the candidate target cells, the UE would perform handover to the corresponding target cell.

More specifically, for conditional handover, UE may report many cells or beams as the possible candidate handover targets based on the RRM measurement. The network issues the conditional handover commands for one or multiple candidates reported by UE. Within the conditional handover configuration, the candidate(s) may be configured with different handover conditions (including the to-be-measured RS and the threshold) and possibly UL access resources for UE access (e.g. random access preambles).

Figure 8:
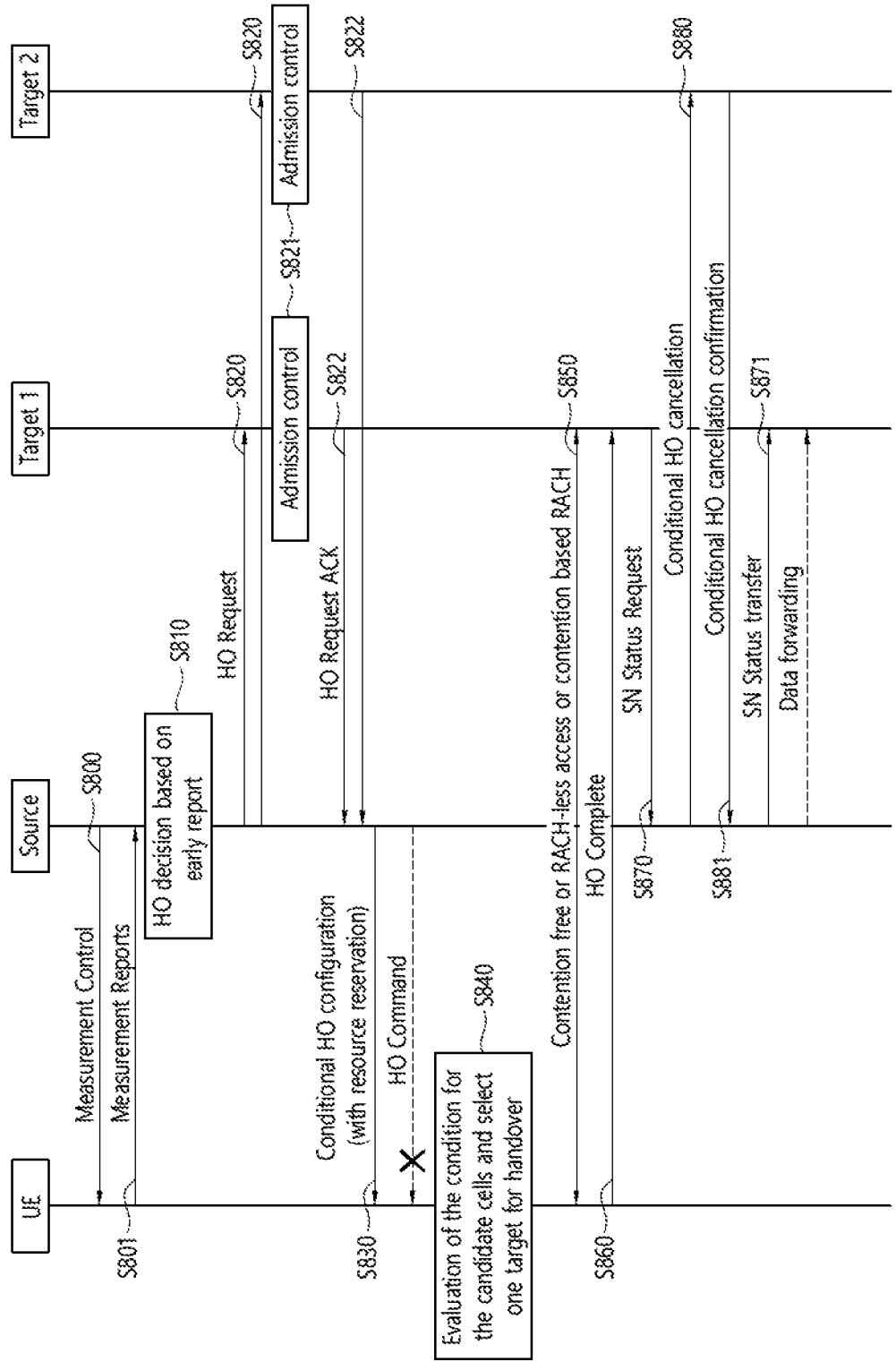
FIG. 8 shows an example of a conditional handover procedure with two target cells to which the technical feature of the present disclosure can be applied.

FIG. 8 shows an example of a conditional handover procedure with two target cells to which the technical feature of the present disclosure can be applied.

In step S800, the UE receives a measurement control from the source node. In step S801, the UE transmits measurement reports (i.e. early report) to the source node.

In step S810, the source node performs handover decision based on the early report from the UE. The source node needs to prepare the handover with one or multiple cells, e.g. requesting the candidate target cell(s) to do admission control and reserve the radio resources accordingly. In step S820, the source node transmits the Handover Request message to the target node 1 and target node 2. In step S821, each of the target node 1 and target node 2 performs admission control. In step S822, each of the target node 1 and target node 2 transmits the Handover Request Acknowledge message which may include a conditional handover command to the source node.

In step S830, the UE receives a conditional handover configuration. The conditional handover configuration may include the conditional handover commands of the target node 1 and target node 2 with resource reservation. The UE does not receive separate handover command from the source node.

Upon receiving the conditional handover configuration, in step S840, the UE starts evaluating the condition for the candidate cells while continuing operating per its current RRC configuration.

When the UE determines that the condition is fulfilled, the UE disconnects from the serving cell, and applies the conditional handover configuration and access to the target cell. In step S850, the UE performs contention free RACH procedure or RACH-less access or contention based RACH procedure towards the target node 1. In step S860, the UE transmits a Handover Complete message to the target node 1.

There are multiple options (on the exact time point) for the source cell to stop its data transmission with the UE, and to start the data forwarding to the exact target cell. The source cell will only know the exact target cell for the UE until the target cell indicates this to the source cell when the handover procedure is successfully executed.

In step S870, the target node 1 transmits the SN Status Request message to the source node. In step S871, the source node transmits the SN Status Transfer message to the target node 1.

Furthermore, in step S880, the source node may transmit the conditional handover cancellation message to the target node 2, which is not final target of the conditional handover procedure. In step S881, the target node 2 may transmit the conditional handover cancellation confirmation message to the source node.

The handover condition may not be fulfilled for a longer time period and hence the UE will stay in the source cell. In this case, the source cell must have the possibility to perform further reconfigurations either to change the UE operation in the current serving cell or to command the UE to handover to a suitable target cell.

Conditional handover has some benefits compared to legacy handover as follows.

1. Handover Delay Perspective

Measurement and handover decision: In legacy handover, measurement and handover decision are performed before handover preparation. After the gNB receives the measurement report, the gNB can start to decide whether handover is needed. If the radio link becomes worse quickly, the delay caused by measurement report and handover decision may affect handover performing timely. In conditional handover, measure report and handover decision are performed when the radio link is still good. From that point of view, conditional handover can save the delay for measurement report and handover decision. However in conditional handover, the UE still needs to perform measurements without reporting to the network before really performing handover, which also cause some delay.

Handover preparation: Handover preparation includes handshake between source cell and target cell. The latency of handover preparation also may affect handover performing timely. In conditional handover, handover preparation is moved earlier, and maybe it can be seen there is no handover preparation phase in conditional handover. Therefore, conditional handover can reduce the handover delay for handover preparation. It should be noted that the time for handshaking between source and target is dependent on the latency over the backhaul between the source cell and target cell.

2. Radio Link Failure (RLF) Probability Perspective

If the radio link becomes worse and the UE cannot perform handover timely, then RLF may happen. According to the above description, conditional handover can reduce the handover delay. Consequently the RLF probability can be reduced with conditional handover.

If the conditional handover shown in FIG. 8 is applied to the handover procedure shown in FIG. 7, then problems may occur. In the conditional handover, since the source gNB performs multiple handover preparations with multiple target gNBs, in Step 5, the source gNB may receive multiple Handover Request Acknowledge messages including the Handover Command which is prepared by each target gNB from the multiple target gNBs. Then, in Step 6, the source gNB provides the UE with Handover Commands for the multiple target gNBs. After that, the UE will be detached from the source gNB and will be handed over to one of the multiple target gNBs.

However, the source gNB does not know to which target gNB the UE has RRC connection (i.e. to which target gNB the UE is handed over) until receiving the UE Context Release message in Step 12. So, the source gNB may send the SN Status Transfer message and forward user data to all of the multiple target gNBs which transmits the Handover Request Acknowledge message. It is unnecessary to transmit the SN Status Transfer message and forward user data to target gNBs to which the UE is not connected after detached from the source gNB. Therefore, a solution for the source gNB to transmit the SN Status Transfer message and forward user data to the target gNB to which the UE is connected should be provided.

Figure 9:
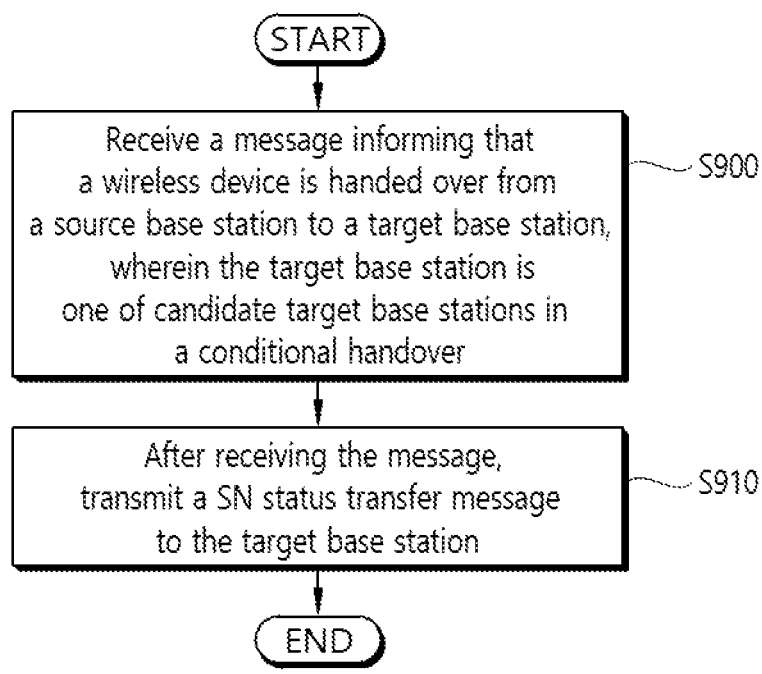
FIG. 9 shows an example of a method for performing a conditional handover according to an implementation of the present disclosure.

FIG. 9 shows an example of a method for performing a conditional handover according to an implementation of the present disclosure.

According to the implementation of the present disclosure, in case of conditional inter-base station handover, the target base station which receives RRCReconfiguration-Complete message from the wireless device (i.e. the target base station to which the wireless device is actually handed over in the conditional handover) requests to the source base station triggering SN Status Transfer procedure and Handover Cancel procedure. Upon receiving the request from the target base station, the source gNB transmits the SN Status Transfer message to the target gNB, and after transmitting the SN Status Transfer message, the source gNB starts forwarding data to the target gNB.

In the description below, it is exemplarily described that the present disclosure is applied to the conditional handover in 5G NR. However, the implementation of the present disclosure can be applied to the conditional handover in 5G LTE as well as conditional handover in 5G NR. That is, the source gNB can be source base station and the target gNB can be target base station.

In the description below, a UE is merely an example of a wireless device. The present disclosure is not limited thereto. The wireless device may include a UE, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

base station. Only after transmitting the SN status transfer message to the target base station, the source base stations may start forwarding data to the target base station.

If the received message requests triggering of a handover cancel procedure, the source base station may perform handover cancel procedure towards the candidate target base stations except the target base station, i.e. remaining target base stations to which the wireless device is not connected.

Alternatively, before the wireless device is detached from the source base station, the source base station may receive a UE handover complete message from the wireless device. The UE handover complete message may include ID of a cell served by the target base station (e.g. target cell ID).

Figure 10:
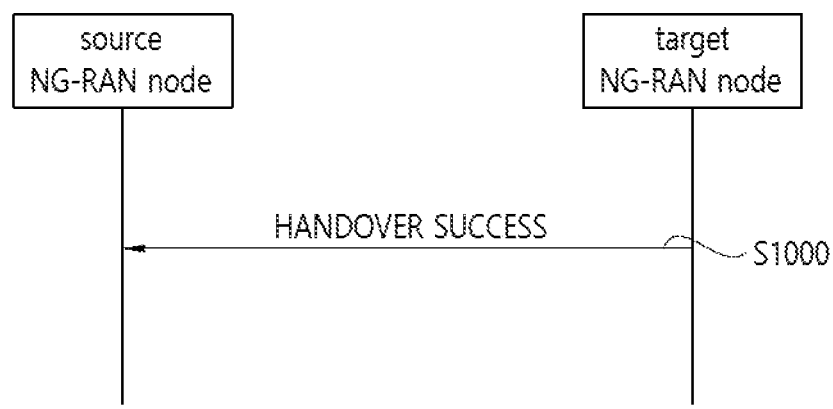
FIG. 10 shows an example of Handover Success procedure according to an implementation of the present disclosure.

FIG. 10 shows an example of Handover Success procedure according to an implementation of the present disclosure.

The Handover Success procedure is used during a conditional handover to enable a target NG-RAN node to inform the source NG-RAN node that the UE has successfully accessed the target NG-RAN node. The procedure uses UE-associated signaling.

In step S1000, the target NG-RAN node initiates the procedure by sending the Handover Success message to the source NG-RAN node.

Table 1 shows an example of the Handover Success message according to an implementation of the present disclosure. This message is sent by the target NG-RAN node to the source NG-RAN node to indicate the successful access of the UE toward the target NG-RAN node.

TABLE 1

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated at the source NG-RAN node. | YES | reject |
| Target NG-RAN node UE XnAP ID | M | | NG-RAN node UE XnAP ID 9.2.3.16 | Allocated at the target NG-RAN node. | YES | reject |

First, the source base station transmits handover request messages to each of the candidate target base stations. Each of the candidate target base stations transmits a handover request acknowledge message to the source base station. The handover request acknowledge message includes a handover command for each of the candidate target base stations.

In step S900, the source base station receives a message informing that a wireless device is handed over from the source base station to a target base station. The target base station is one of candidate target base stations in the conditional handover procedure.

The message may be a handover success message. The handover success message will be described in detail below in FIG. 10. The message may request triggering a transmission of the SN status transfer message. The message may request triggering of a handover cancel procedure. The wireless device may already have been detached from the source base station. The target base station may be a base station which receives a reconfiguration complete message from the wireless device.

In step 5910, after receiving the message, the source base station transmits a SN status transfer message to the target The Handover Success message corresponds to the message shown in step S900 of FIG. 9.

The Handover Success message shown in FIG. 10 is a message defined in 5G NR. However, the Handover Success message can be defined similarly in 5G LTE. For example, in 5G LTE, the Handover Success procedure is used during a conditional handover to enable a target RAN node to inform the source RAN node that the UE has successfully accessed the target RAN node. The target RAN node initiates the procedure by sending the Handover Success message to the source RAN node. The Handover Success message is sent by the target RAN node to the source RAN node to indicate the successful access of the UE toward the target RAN node.

Figure 11:
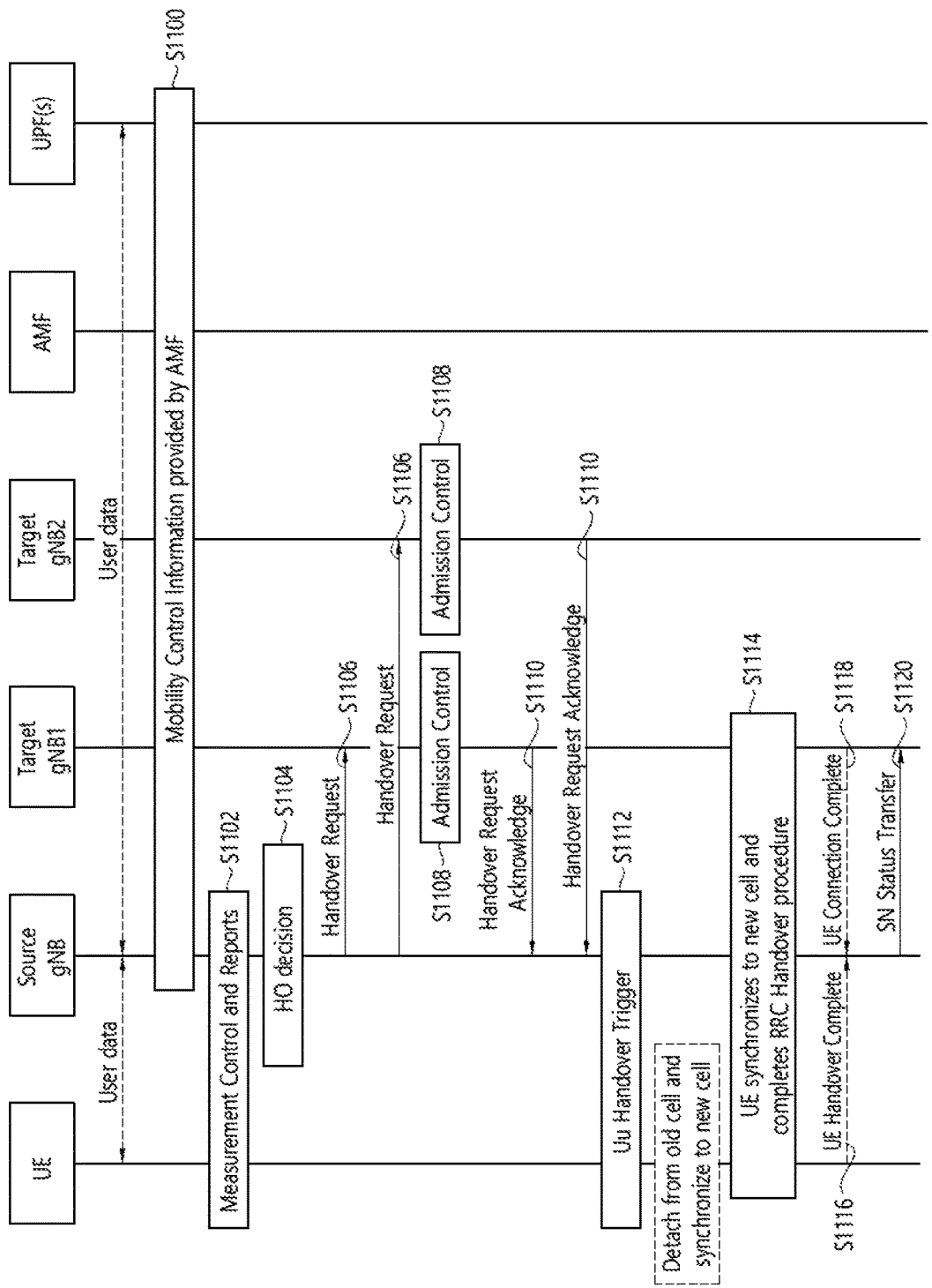
FIG. 11 and FIG. 12 show another example of a method for performing a conditional handover according to an implementation of the present disclosure.
Figure 12:
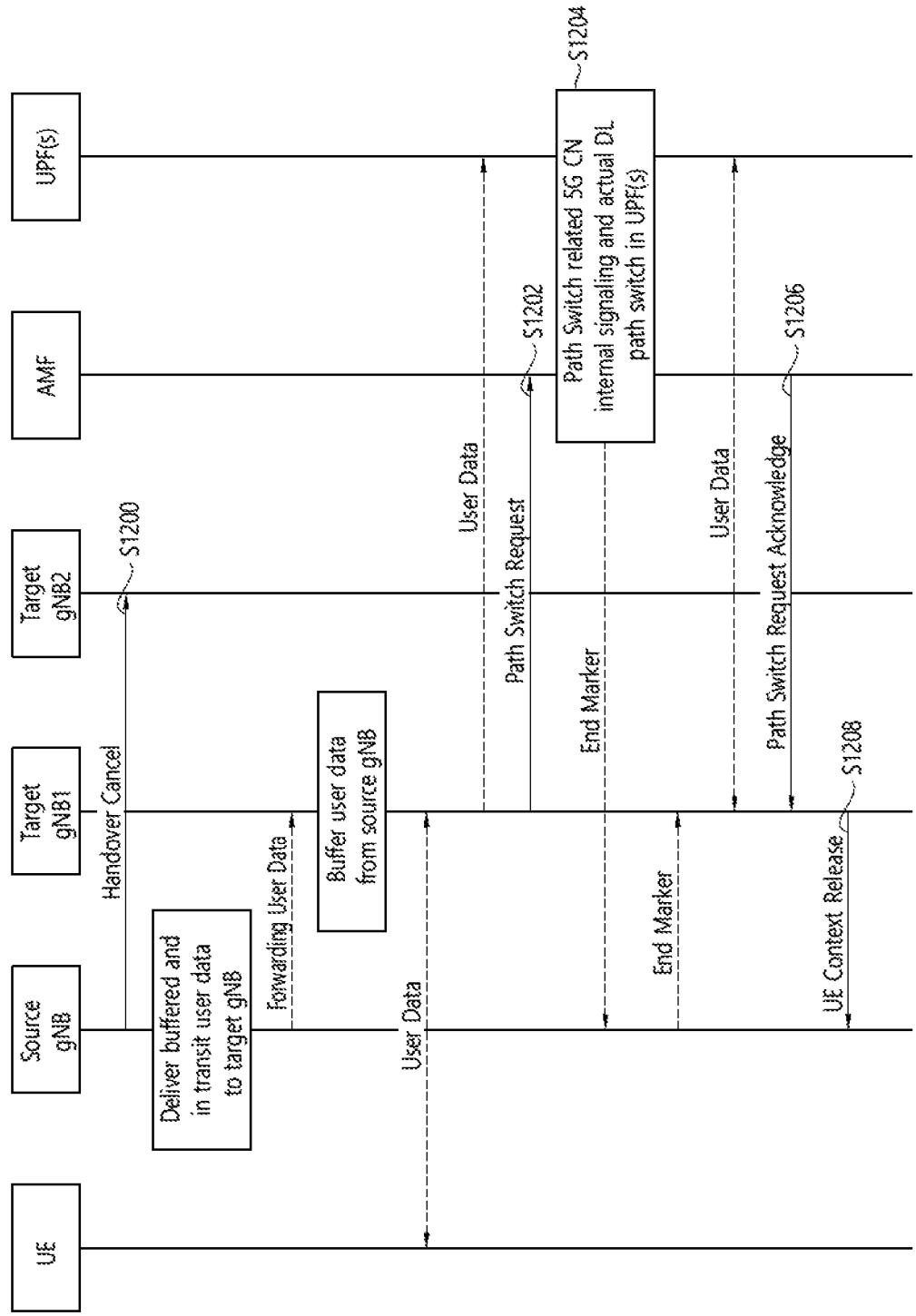

FIG. 11 and FIG. 12 show another example of a method for performing a conditional handover according to an implementation of the present disclosure.

FIG. 11 and FIG. 12 are modification of the handover procedure shown in FIG. 7 by applying the technical features of the present disclosure regarding the conditional handover.

FIG. 11 is described.

Step S1100: The UE context within the source gNB contains information regarding roaming and access restrictions which were provided either at connection establishment or at the last TA update.

Step S1102: The source gNB configures the UE measurement procedures. The measurement configuration may include the list of candidate cells which the UE measures. According to the measurement configuration, the UE reports the measurement result for cells which satisfy the condition.

Step S1104: The source gNB decides to handover the UE, based on MeasurementReport and RRM information.

Step S1106: The source gNB issues a Handover Request message to each of multiple candidate target gNBs passing a transparent RRC container with necessary information to prepare the handover at each of the multiple candidate target gNBs. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping applied to the UE, the minimum system information from source gNB, the UE capabilities for different RATs, PDU session related information, and can include the UE reported measurement information including beam-related information if available. The PDU session related information includes the slice information (if supported) and QoS flow level QoS profile(s).

Step S1108: Admission control may be performed by each of the multiple candidate target gNBs. Slice-aware admission control shall be performed if the slice information is sent to each of the multiple candidate target gNBs. If the PDU sessions are associated with non-supported slices, each of the multiple candidate target gNBs shall reject such PDU Sessions.

Step S1110: Each of the multiple candidate target gNBs prepares the handover with L1/L2 and sends the Handover Request Acknowledge to the source gNB. The Handover Request Acknowledge message includes a transparent container to be sent to the UE as an RRC message to perform the handover.

Step S1112: The source gNB triggers the Uu handover and sends the RRCReconfiguration message containing Handover Command message received from each of the multiple candidate target gNBs to the UE. The Handover Command message carries the information required to access each of the multiple candidate target cells, which includes at least the target cell ID, the new C-RNTI, the target gNB security algorithm identifiers for the selected security algorithms, can include a set of RACH resources, the association between RACH resources and SS blocks, the association between RACH resources and UE-specific CSI-RS configuration(s), common RACH resources, and target cell SIBs, etc.

Step S1114: The UE synchronizes to one of the multiple candidate target cells indicated by the received Handover Command messages. The UE completes the RRC handover procedure by sending RRCReconfigurationComplete message to the target gNB1.

Step S1116: If step S1114 is completed while the UE has not been detached from the source gNB, the UE may send the UE Handover Complete message to the source gNB. The UE Handover Complete message may include the target cell ID, i.e. indicates the target gNB1. Therefore, the source gNB can know to which target gNB the UE is connected the UE among the multiple candidates target gNBs. The UE Handover Complete message may be a new message or an existing message.

Step S1118: If step S1114 is completed after the UE is detached from the source gNB, upon receiving the RRCReconfigurationComplete message from the UE, the target gNB1 transmits a UE Connection Complete message to the source gNB. Therefore, the source gNB can know to which target gNB the UE is connected the UE among the multiple candidates target gNBs. The UE Connection Complete message may include UE Connection Complete Indication, which requests triggering the SN Status Transfer and/or the Handover Cancel procedures. The UE Connection Complete message may be a new message or an existing message. The UE Connection Complete message may be a Handover Success message shown in FIG. 10 above.

In step S1120: Upon receiving the UE Connection Complete message from the target gNB1, the source gNB sends the SN Status Transfer message to the target gNB1.

FIG. 12 is described.

Step S1200: Upon receiving the UE Connection Complete message from the target gNB1, the source gNB transmits the Handover Cancel message to the target gNB2, i.e. the gNB to which the UE is not connected.

Furthermore, upon receiving the UE Connection Complete message from the target gNB1, the source gNB starts to forward user data to the target gNB1.

Step S1202: The target gNB1 sends a Path Switch Request message to AMF to trigger 5GC to switch the DL data path towards the target gNB1 and to establish an NG-C interface instance towards the target gNB1.

Step S1204: 5GC switches the DL data path towards the target gNB1. The UPF sends one or more "end marker" packets on the old path to the source gNB per PDU session/tunnel and then can release any U-plane/transport network layer (TNL) resources towards the source gNB.

Step S1206: The AMF confirms the Path Switch Request message with the Path Switch Request Acknowledge message.

Step S1208: By sending the UE Context Release message, the target gNB1 informs the source gNB about the success of handover and triggers the release of resources by the source gNB. The target gNB1 sends this message after the Path Switch Request Acknowledge message is received from the AMF. Upon reception of the UE Context Release message, the source gNB can release radio and C-plane related resources associated to the UE context. Any ongoing data forwarding may continue.

According to the implementation of the present disclosure shown in FIG. 9 to FIG. 11, only after receiving a message from the target base station to which the wireless device is handed over in the conditional handover over Xn interface, the source base station can transmit the SN Status Transfer message and forward user data to the target base station to which the wireless device is connected. Therefore, unnecessary signalling and data forwarding to target base stations to which the wireless device is not connected can be removed in conditional handover over Xn interface. The UE's experience can be enhanced by reducing the handover failure caused by not receiving handover command at a proper time.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 13:
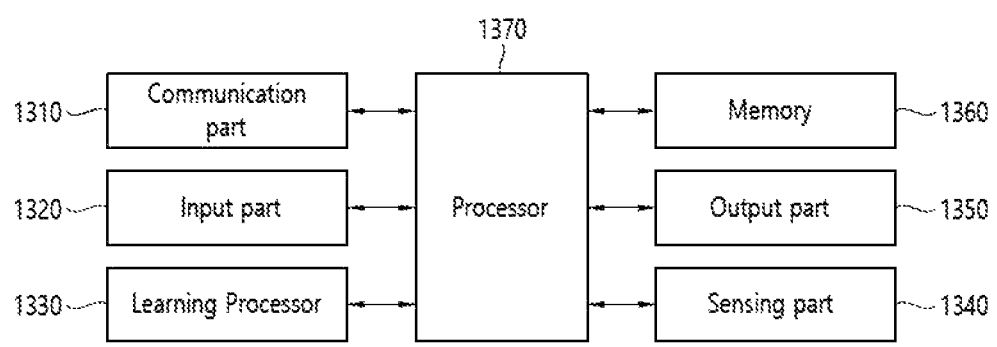
FIG. 13 shows an example of an AI device to which the technical features of the present disclosure can be applied.

FIG. 13 shows an example of an AI device to which the technical features of the present disclosure can be applied.

The AI device 1300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 13, the AI device 1300 may include a communication part 1310, an input part 1320, a learning processor 1330, a sensing part 1340, an output part 1350, a memory 1360, and a processor 1370.

The communication part 1310 can transmit and/or receive data to and/or from external devices such as the AI devices and the AI server using wire and/or wireless communication technology. For example, the communication part 1310 can transmit and/or receive sensor information, a user input, a learning model, and a control signal with external devices. The communication technology used by the communication part 1310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1320 can acquire various kinds of data. The input part 1320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1320 can acquire input data to be used when acquiring an output using learning data and a learning model for model learning. The input part 1320 may obtain raw input data, in which case the processor 1370 or the learning processor 1330 may extract input features by preprocessing the input data.

The learning processor 1330 may learn a model composed of an ANN using learning data. The learned ANN can be referred to as a learning model. The learning model can be used to infer result values for new input data rather than learning data, and the inferred values can be used as a basis for determining which actions to perform. The learning processor 1330 may perform AI processing together with the learning processor of the AI server. The learning processor 1330 may include a memory integrated and/or implemented in the AI device 1300. Alternatively, the learning processor 1330 may be implemented using the memory 1360, an external memory directly coupled to the AI device 1300, and/or a memory maintained in an external device.

The sensing part 1340 may acquire at least one of internal information of the AI device 1300, environment information of the AI device 1300, and/or the user information using various sensors. The sensors included in the sensing part 1340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1350 may generate an output related to visual, auditory, tactile, etc. The output part 1350 may include a display unit for outputting visual information, a speaker for outputting auditory information, and/or a haptic module for outputting tactile information.

The memory 1360 may store data that supports various functions of the AI device 1300. For example, the memory 1360 may store input data acquired by the input part 1320, learning data, a learning model, a learning history, etc.

The processor 1370 may determine at least one executable operation of the AI device 1300 based on information determined and/or generated using a data analysis algorithm and/or a machine learning algorithm. The processor 1370 may then control the components of the AI device 1300 to perform the determined operation. The processor 1370 may request, retrieve, receive, and/or utilize data in the learning processor 1330 and/or the memory 1360, and may control the components of the AI device 1300 to execute the predicted operation and/or the operation determined to be desirable among the at least one executable operation. The processor 1370 may generate a control signal for controlling the external device, and may transmit the generated control signal to the external device, when the external device needs to be linked to perform the determined operation. The processor 1370 may obtain the intention information for the user input and determine the user's requirements based on the obtained intention information. The processor 1370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1330 and/or learned by the learning processor of the AI server, and/or learned by their distributed processing. The processor 1370 may collect history information including the operation contents of the AI device 1300 and/or the user's feedback on the operation, etc. The processor 1370 may store the collected history information in the memory 1360 and/or the learning processor 1330, and/or transmit to an external device such as the AI server. The collected history information can be used to update the learning model. The processor 1370 may control at least some of the components of AI device 1300 to drive an application program stored in memory 1360. Furthermore, the processor 1370 may operate two or more of the components included in the AI device 1300 in combination with each other for driving the application program.

Figure 14:
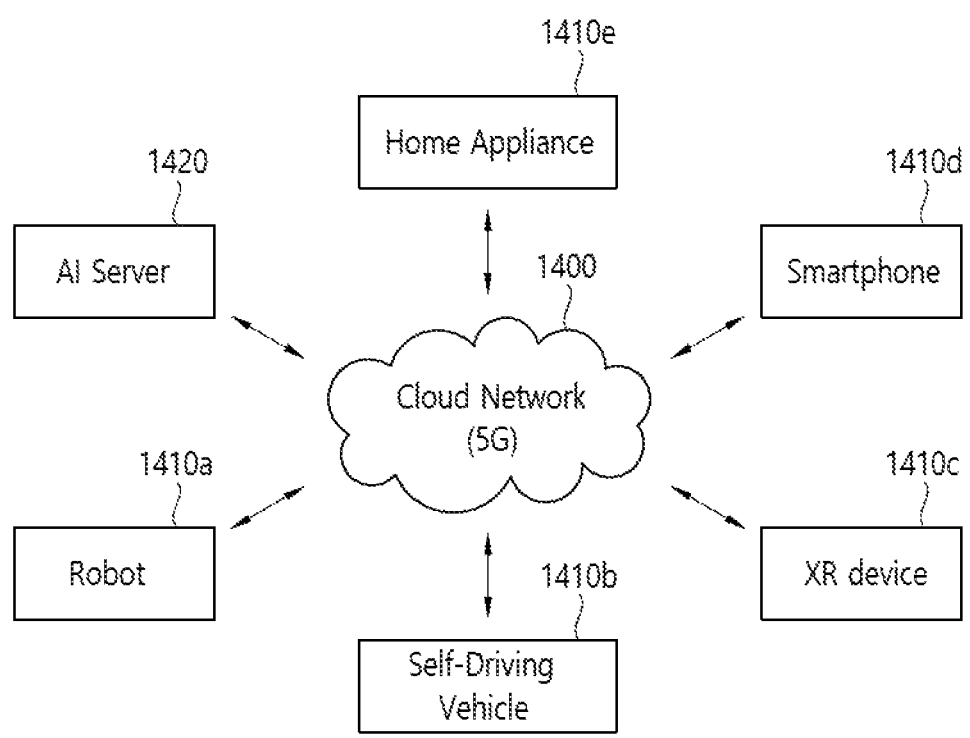
FIG. 14 shows an example of an AI system to which the technical features of the present disclosure can be applied.

FIG. 14 shows an example of an AI system to which the technical features of the present disclosure can be applied.

Referring to FIG. 14, in the AI system, at least one of an AI server 1420, a robot 1410a, an autonomous vehicle 1410b, an XR device 1410c, a smartphone 1410d and/or a home appliance 1410e is connected to a cloud network 1400. The robot 1410a, the autonomous vehicle 1410b, the XR device 1410c, the smartphone 1410d, and/or the home appliance 1410e to which the AI technology is applied may be referred to as AI devices 1410a to 1410e.

The cloud network 1400 may refer to a network that forms part of a cloud computing infrastructure and/or resides in a cloud computing infrastructure. The cloud network 1400 may be configured using a 3G network, a 4G or LTE network, and/or a 5G network. That is, each of the devices 1410a to 1410e and 1420 consisting the AI system may be connected to each other through the cloud network 1400. In particular, each of the devices 1410a to 1410e and 1420 may communicate with each other through a base station, but may directly communicate with each other without using a base station.

The AI server 1420 may include a server for performing AI processing and a server for performing operations on big data. The AI server 1420 is connected to at least one or more of AI devices constituting the AI system, i.e. the robot 1410a, the autonomous vehicle 1410b, the XR device 1410c, the smartphone 1410d and/or the home appliance 1410e through the cloud network 1400, and may assist at least some AI processing of the connected AI devices 1410a to 1410e. The AI server 1420 can learn the ANN according to the machine learning algorithm on behalf of the AI devices 1410a to 1410e, and can directly store the learning models and/or transmit them to the AI devices 1410a to 1410e. The AI server 1420 may receive the input data from the AI devices 1410a to 1410e, infer the result value with respect to the received input data using the learning model, generate a response and/or a control command based on the inferred result value, and transmit the generated data to the AI devices 1410a to 1410e. Alternatively, the AI devices 1410a to 1410e may directly infer a result value for the input data using a learning model, and generate a response and/or a control command based on the inferred result value.

Various implementations of the AI devices 1410a to 1410e to which the technical features of the present disclosure can be applied will be described. The AI devices 1410a to 1410e shown in FIG. 14 can be seen as specific implementations of the AI device 1300 shown in FIG. 13.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a source base station in a conditional handover procedure, the method comprising:
   receiving a message informing that a wireless device is handed over from the source base station to a target base station, wherein the target base station is one of candidate target base stations in the conditional handover procedure; and
   after receiving the message, transmitting a sequence number (SN) status transfer message to the target base station,
   wherein a handover request message is transmitted by the source base station to each of the candidate target base stations,
   wherein a handover request acknowledge message is received by the source base station from each of the candidate target base stations, and
   wherein the handover request acknowledge message includes a handover command for each of the candidate target base stations.

2. The method of claim 1, wherein data is forwarded to the target base station after transmitting the SN status transfer message to the target base station.

3. The method of claim 1, wherein the message is a handover success message.

4. The method of claim 1, wherein the message requests triggering a transmission of the SN status transfer message.

5. The method of claim 1, wherein the message requests triggering of a handover cancel procedure.

6. The method of claim 5, wherein the handover cancel procedure is performed towards the candidate target base stations except the target base station.

7. The method of claim 1, wherein the wireless device is already detached from the source base station.

8. The method of claim 1, wherein the target base station is a base station which receives a reconfiguration complete message from the wireless device.

9. The method of claim 1, wherein a user equipment (UE) handover complete message is received by the source base station from the wireless device, before the wireless device is detached from the source base station.

10. The method of claim 9, wherein the UE handover complete message includes an identifier (ID) of a cell served by the target base station.

11. The method of claim 1, wherein the wireless device is in communication with at least one of a user equipment, a network, or autonomous vehicles other than the wireless device.

12. A processing device configured to control a source base station to operate a conditional handover procedure, the processing device comprising:
- at least one processor; and
- at least one computer memory operably connectable to the at least one processor and storing instructions that, based on being executed by the at least one processor, perform operations comprising:
- receiving a message informing that a wireless device is handed over from the source base station to a target base station, wherein the target base station is one of candidate target base stations in the conditional handover procedure; and
- after receiving the message, transmitting a sequence number (SN) status transfer message to the target base station,
- wherein a handover request message is transmitted by the source base station to each of the candidate target base stations,
- wherein a handover request acknowledge message is received by the source base station from each of the candidate target base stations, and
- wherein the handover request acknowledge message includes a handover command for each of the candidate target base stations.

13. A source base station configured to operate a conditional handover procedure, the source base station comprising:
- a transceiver;
- at least one processor; and
- at least one computer memory operably connectable to the at least one processor and storing instructions that, based on being executed by the at least one processor, perform operations comprising:
- receiving, through the transceiver, a message informing that a wireless device is handed over from the source base station to a target base station, wherein the target base station is one of candidate target base stations in the conditional handover procedure; and
- after receiving the message, transmitting, through the transceiver, a sequence number (SN) status transfer message to the target base station,
- wherein a handover request message is transmitted by the source base station to each of the candidate target base stations,
- wherein a handover request acknowledge message is received by the source base station from each of the candidate target base stations, and
- wherein the handover request acknowledge message includes a handover command for each of the candidate target base stations.

14. The source base station of claim 13, wherein data is forwarded to the target base station after transmitting the SN status transfer message to the target base station.

15. The source base station of claim 13, wherein the message is a handover success message.

16. The source base station of claim 13, wherein the message requests triggering a transmission of the SN status transfer message.

17. The source base station of claim 13, wherein the message requests triggering of a handover cancel procedure.

18. The source base station of claim 17, wherein the handover cancel procedure is performed towards the candidate target base stations except the target base station.

19. The source base station of claim 13, wherein the wireless device is already detached from the source base station.

20. The source base station of claim 13, wherein the target base station is a base station which receives a reconfiguration complete message from the wireless device.

* * * * *